(12) United States Patent
Carr et al.

(10) Patent No.: US 10,758,064 B2
(45) Date of Patent: Sep. 1, 2020

(54) HANGER FOR DISPLAYING FLOOR MATS

(71) Applicant: Custom Accessories Inc., Richmond, IL (US)

(72) Inventors: Jason D. Carr, Bentleigh East (AU); Warwick J. Brown, North Melbourne (AU); Marcus Krigsman, Rosanna (AU)

(73) Assignee: Custom Accessories Inc., Richmond, IL (US)

( * ) Notice: Subject to any disclaimer, the term of this patent is extended or adjusted under 35 U.S.C. 154(b) by 0 days.

(21) Appl. No.: 16/315,009

(22) PCT Filed: Jul. 19, 2017

(86) PCT No.: PCT/US2017/042839
§ 371 (c)(1),
(2) Date: Jan. 3, 2019

(87) PCT Pub. No.: WO2018/017707
PCT Pub. Date: Jan. 25, 2018

(65) Prior Publication Data
US 2019/0307264 A1  Oct. 10, 2019

Related U.S. Application Data

(60) Provisional application No. 62/364,047, filed on Jul. 19, 2016.

(51) Int. Cl.
*A47F 5/00* (2006.01)
*A47F 7/16* (2006.01)
*B60N 3/04* (2006.01)

(52) U.S. Cl.
CPC .............. *A47F 5/0006* (2013.01); *A47F 7/16* (2013.01); *B60N 3/04* (2013.01)

(58) Field of Classification Search
CPC ............ A47F 5/0006; A47F 7/16; B60N 3/04
See application file for complete search history.

(56) References Cited

U.S. PATENT DOCUMENTS

| 3,963,154 A | * | 6/1976 | Schwartz | A47G 25/32 223/85 |
| 4,074,838 A | * | 2/1978 | Blasnik | A47G 25/32 223/85 |

(Continued)

FOREIGN PATENT DOCUMENTS

| DE | 29500448 U1 | 6/1995 |
| GB | 2203033 A | 10/1988 |
| GB | 2377631 A | 1/2003 |

OTHER PUBLICATIONS

U.S. Patent and Trademark Office, International Search Report and Written Opinion in PCT Application No. PCT/US2017/042839, dated Sep. 29, 2017.

*Primary Examiner* — Anita M King
(74) *Attorney, Agent, or Firm* — Leydig, Voit & Mayer, Ltd.

(57) ABSTRACT

A floor mat hanger (10) includes a hanger body (12) having a hanger aperture (20) for receiving a support member, and a hook member (14) selectively attachable to the hanger body (12) through the hanger aperture (20). The hook member (14) is selectively movable to and between a first configuration, wherein the hook portion (22) is spaced from the hanger body (12) to facilitate hanging the hanger body (12) from an external support structure, and a second configuration wherein the hook portion (22) is positioned adjacent the hanger body (12) in a compact arrangement. The floor mat hanger (10) may further include at least one post (16) configured to support a floor mat thereon, and locking structure (18) associated with the at least one post (16) to prevent a floor mat from being removed from the post (16).

18 Claims, 8 Drawing Sheets

(56) References Cited

U.S. PATENT DOCUMENTS

| | | | |
|---|---|---|---|
| 7,389,885 B2* | 6/2008 | Masanek, Jr. | A47F 5/0006 |
| | | | 211/113 |
| 9,301,625 B2 | 4/2016 | Fiumefreddo et al. | |
| D815,852 S * | 4/2018 | Carr | D6/513 |
| 2015/0102190 A1* | 4/2015 | Fiumefreddo | A47F 7/16 |
| | | | 248/215 |
| 2016/0023840 A1* | 1/2016 | Matthews | B65D 73/0007 |
| | | | 220/4.22 |

* cited by examiner

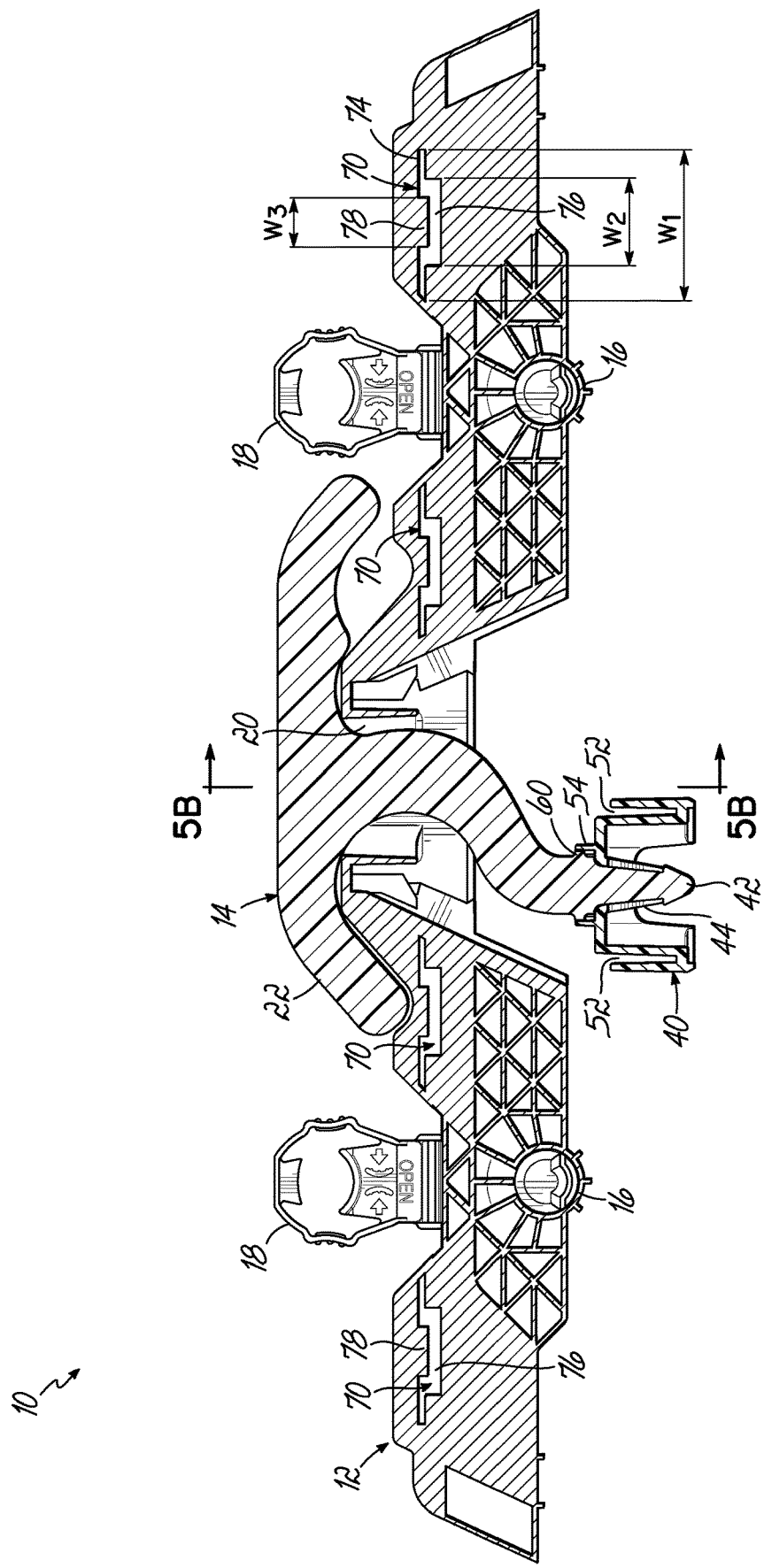

US 10,758,064 B2

HANGER FOR DISPLAYING FLOOR MATS

CROSS-REFERENCE

This application claims the filing benefit of U.S. Provisional Patent Application Ser. No. 62/364,047, filed Jul. 19, 2016, the disclosure of which is incorporated by reference herein in its entirety.

TECHNICAL FIELD

The present invention relates generally to apparatus for displaying products at a point of sale and, more particularly, to a hanger for displaying floor mats.

BACKGROUND

At a point of sale, vehicle floor mats and similar products are generally hung on hangers for display in racks. These hangers are typically of low quality and may be easily broken or damaged do to the relatively heavy weight of the mats that are supported on the hangers. Hangers for suspending these floor mats must therefore be strong and be capable of securing the mats well enough so that they do not become separated, even when subjected to forces experienced during shipping or display. Moreover, conventional hangers for suspending floor mats do not facilitate displaying the floor mats in different orientations. It is of considerable advantage if such hangers can be easily injection molded from plastic and attached to the mats before they are shipped to distributors, as well as reattached at the consumer level in the event that a customer return is required.

SUMMARY

The present invention provides a hanger that facilitates the display of floor mats or similar articles, particularly at a point of sale. While the invention will be described in connection with certain embodiments, it will be understood that the invention is not limited to these embodiments. On the contrary, the invention includes all alternatives, modifications and equivalents as may be included within the spirit and scope of the present invention.

In one embodiment, a floor mat hanger in accordance with the principles of the present disclosure includes a hanger body having a hanger aperture for receiving a support member, and a hook member selectively attachable to the hanger body through the hanger aperture. The hook member is selectively movable to and between a first configuration, wherein the hook portion is spaced from the hanger body to facilitate hanging the hanger body from an external support structure, and a second configuration wherein the hook portion is positioned adjacent the hanger body in a compact arrangement. The floor mat hanger may further include at least one post configured to support a floor mat thereon, and locking structure associated with the at least one post to prevent a floor mat from being removed from the post.

The floor mat hanger may further include first interengaging structure on the hanger body and second interengaging structure on the hook member. The first and second interengaging structure cooperate to retain the hook member in the second configuration when the first interengaging structure is engaged with the second interengaging structure. In another aspect, the floor may hanger may further include a keeper that selectively attachable to a shank portion of the hook member for retaining the hook member on the hanger body. The hook member may be selectively adjusted to discrete angular positions relative to the hanger body to facilitate supporting floor mats on the hanger in different positions when hung for display in a retail setting, for example.

In another aspect, the floor may hanger may further include a plurality of header retention apertures in the hanger body configured and arranged to receive and secure a display panel on the hanger body. The display panel may include a generally planar portion and at least one panel tab sized and arranged to be received in a retention aperture in the hanger body.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

FIG. 4B is a cross-sectional view of the hanger of FIG. 1, depicting the hook member in a stowed configuration.

DETAILED DESCRIPTION

Figure 1:
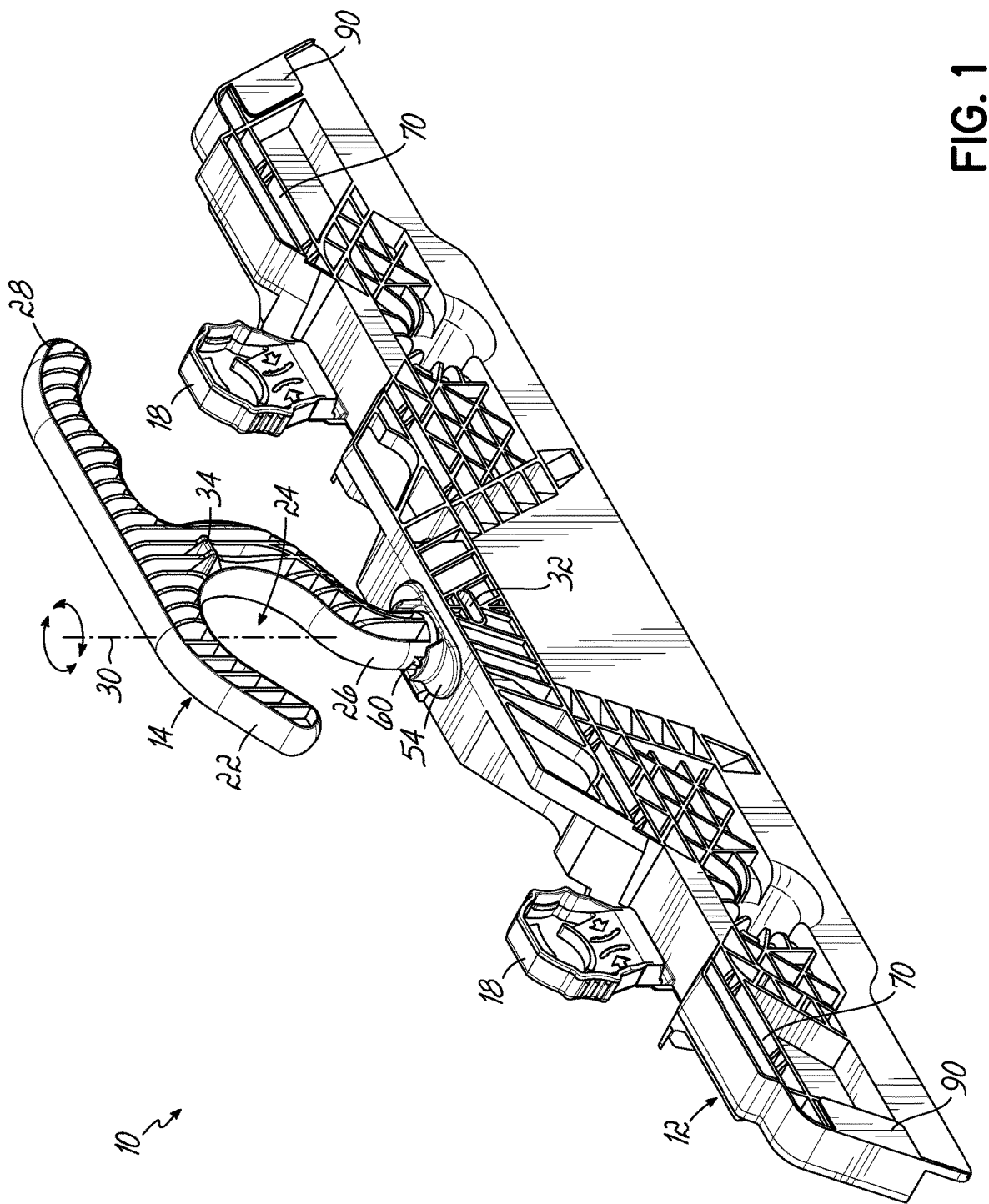
FIG. 1 is a perspective view of an exemplary hanger for displaying floor mats, in accordance with the principles of the present invention.
Figure 2:
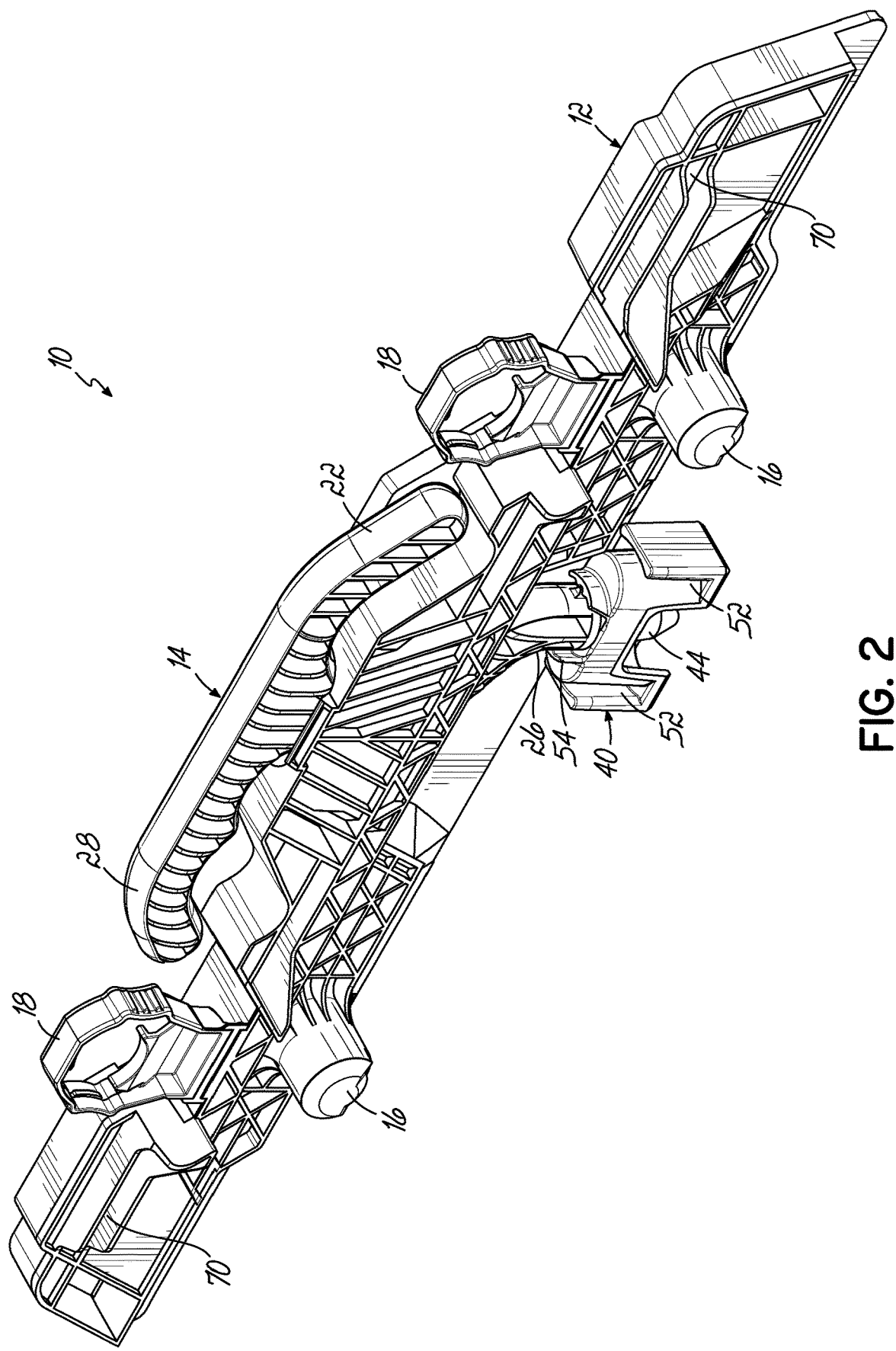
FIG. 2 is a perspective view of the hanger of FIG. 1, viewed from the opposite side and depicting a hook member of the hanger in a stowed configuration.
Figure 3:
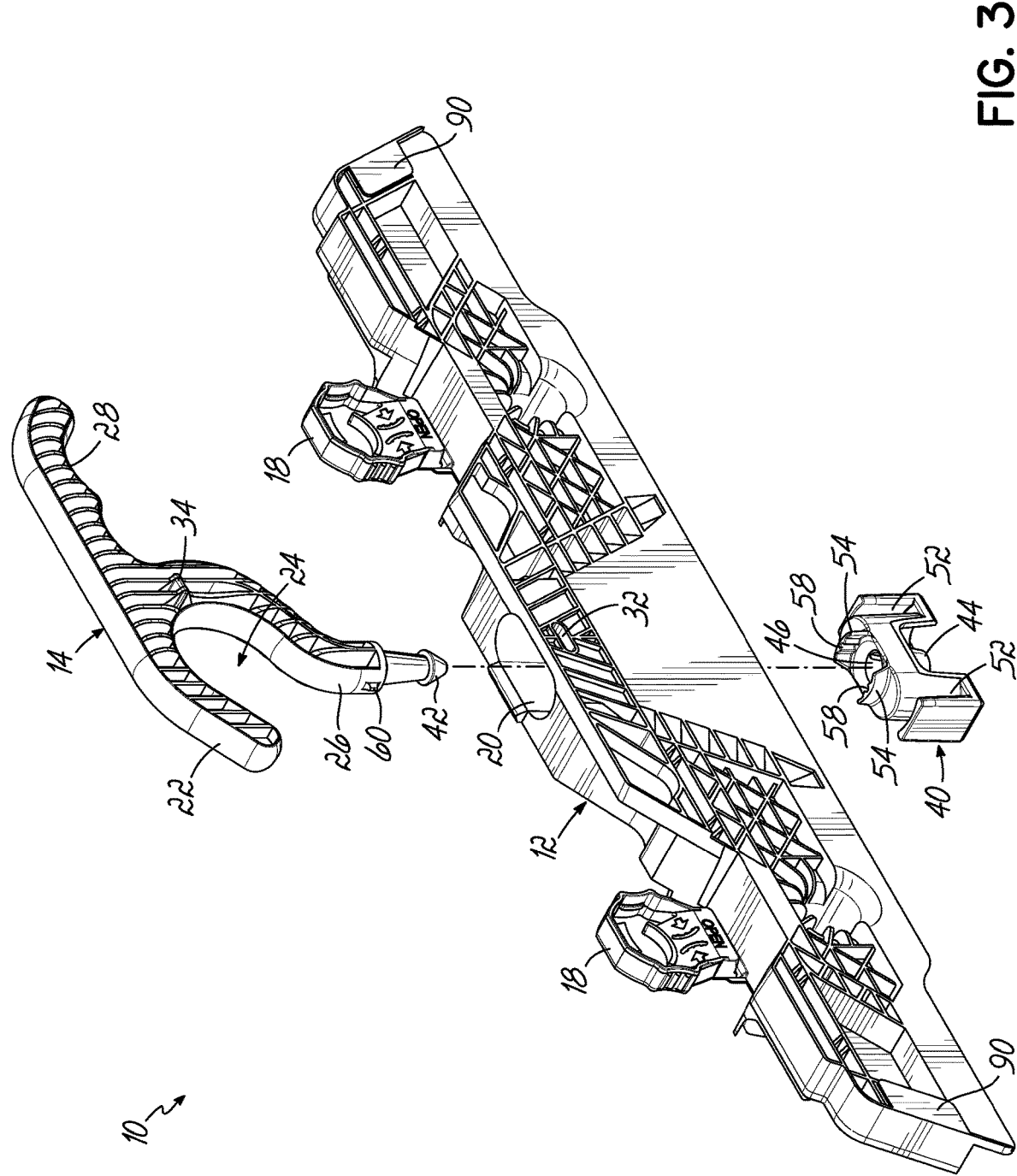
FIG. 3 is an exploded perspective view of the hanger of FIG. 1.

FIGS. 1-3 illustrate an exemplary floor mat hanger 10 for displaying floor mats (not shown) in accordance with the principles of the present invention. The floor mat hanger 10 includes a hanger body 12 and a hook member 14 that is attachable to the hanger body 12 to facilitate supporting the floor mat hanger 10, together with one or more floor mats secured thereto, on a support rod or other structure suitable for displaying the one or more floor mats, such as in a retail sales setting for example. As best illustrated in FIG. 2, the exemplary hanger body 12 includes one or more posts 16 extending in directions generally normal to the plane of the hanger body 12 for supporting floor mats on the hanger body 12. The floor mat hanger 10 may further include locking structure 18 associated with the one or more posts 16 for securing floor mats on the posts 16. In the embodiment shown, the floor mat hanger 10 includes two posts 16 and two corresponding locking structures 18. Each locking structure 18 may be moved from a first, free condition spaced from the respective posts 16, wherein a floor mat can be received over or removed from the post 16, and a second, secured condition adjacent or engaged with the post 16, wherein a floor mat is prevented from being removed from the respective post 16. Additional details of the locking structure 18 illustrated in FIG. 2 can be found with reference to co-pending U.S. patent application Ser. No. 14/512,843, the disclosure of which is incorporated by reference herein its entirety. Accordingly, further details regarding the posts 16 and locking structure 18 is not described further herein.

While the exemplary floor mat hanger 10 has been shown and described herein as having two posts 16 and corresponding locking structure 18, it will be appreciated that only a single post may be used, or more than two posts may be used, as may be desired. Alternatively, various other structure for suitable for supporting and securing floor mats on the hanger body 12 may be used. As non-limiting examples, such structure may comprise locking structures such as those shown and described in U.S. Pat. Nos. 9,301,625 or 9,004,276, the disclosures of which are incorporated by reference herein in their entirety.

In the embodiment shown, the hanger body 12 further includes a hanger aperture 20 for receiving the hook member 14 and to facilitate coupling the hook member 14 with the hanger body 12. The exemplary hook member 14 includes a generally arcuate hook portion 22 defining a recess 24 for engaging a support that is configured to suspend the floor mat hanger 10 therefrom for the display of a floor mat. The hook member 14 further includes a generally straight shank portion 26 extending in a direction away from the arcuate hook portion 22. The hook member 14 may further include a handle portion 28 spaced from the shank portion 26 and extending away from the hook portion 22. The shank portion 26 of the hook member 14 may be received into the hanger aperture 20 and secured, as will be described below, in a manner that permits rotation of the hook member 14 about a vertical axis 30 extending through the hanger aperture 20.

In the embodiment shown, the hook member 14 may be coupled with the hanger body 12 such that the hook member 14 is moveable to and between a first configuration wherein the hook portion 22 of the hook member 14 is spaced from the hanger body 12 to thereby facilitate hanging the hanger body 12 from a support structure, such as in a retail display, and a second configuration wherein the hook portion 22 is positioned adjacent the hanger body 12 in a compact arrangement that facilitates storage and/or transportation of the floor mat hanger 10.

Figure 4A:
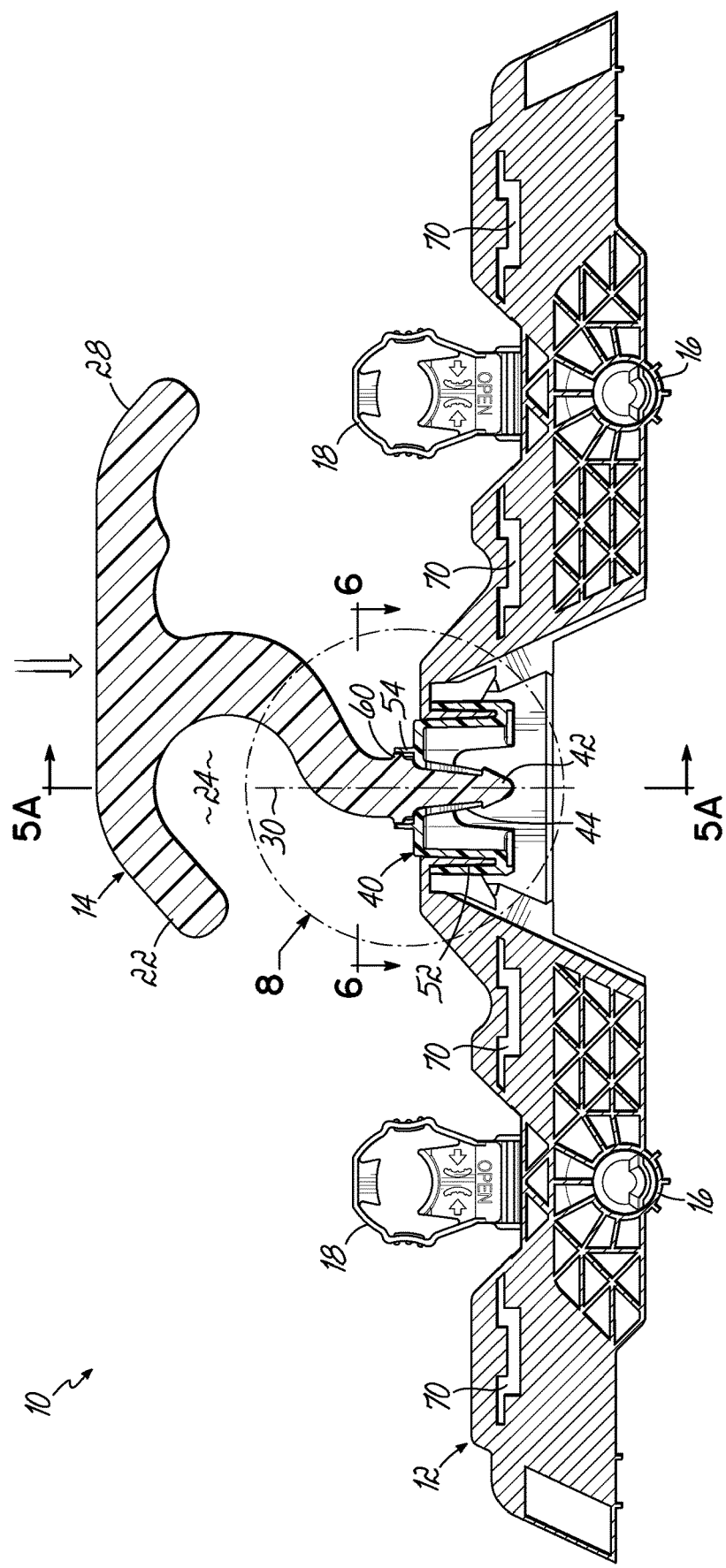
FIG. 4A is a cross-sectional view of the hanger of FIG. 1, depicting the hook member in a first configuration.
Figure 5B:
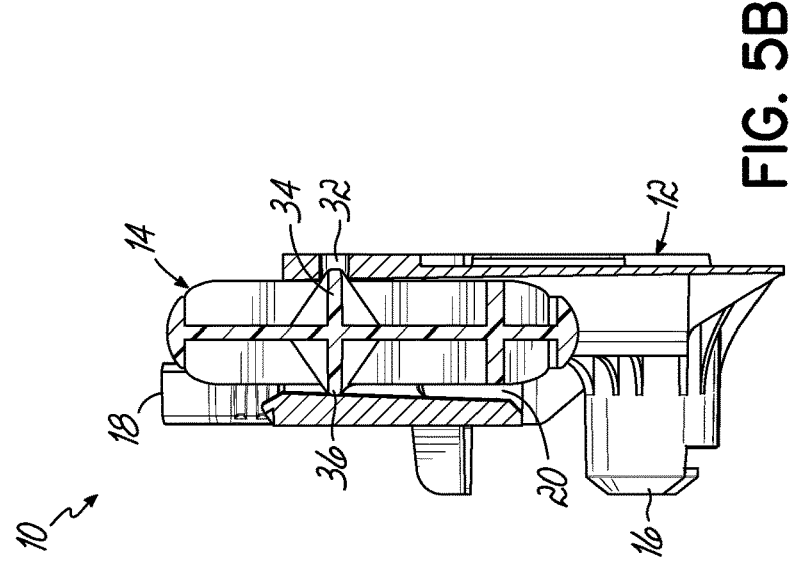
FIG. 5B is a cross-sectional view of the hanger of FIG. 4B, taken along line 5B-5B.
Figure 5A:
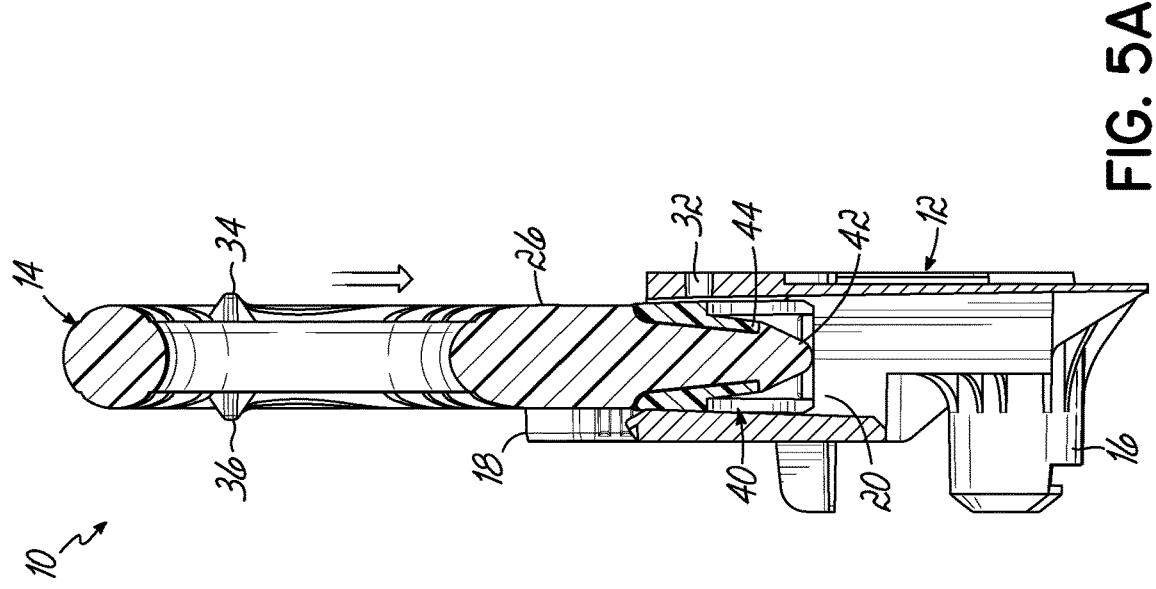
FIG. 5A is a cross-sectional view of the floor mat hanger of FIG. 4A, taken along line 5A-5A.

With continued reference to FIGS. 1-3, and referring further to FIGS. 4A and 4B, the first configuration of the hook member 14 is illustrated in FIGS. 1 and 4A wherein the hook portion 22 is spaced from the hanger body 12. FIGS. 2 and 4B depict the hook member 14 in the second, compact configuration wherein the hook portion 22 is positioned adjacent the hanger body 12. The floor mat hanger 10 may further include first interengaging structure 32 on the hanger body 12 and second interengaging structure 34 on the hook member 14 that is complementary to the first engaging structure 32, and which cooperates with the first interengaging structure 32 to retain the hook member 14 in the second configuration when the first and second interengaging structures 32, 34 are engaged with one another. In the embodiment shown, the first interengaging structure 32 comprises an aperture defined in the hanger body 12 proximate the hanger aperture 20 that receives the shank portion 26 of the hook member 14. The second interengaging structure 34 comprises a protrusion provided on at least one side of the hook member 14 and positioned to be received through the aperture 32 when the hook 14 member is moved to the second, compact configuration, as depicted in FIGS. 5A-5B.

The floor mat hanger 10 may further include biasing structure 36 on the hanger body 12 or the hook member 14 to urge the first interengaging structure 32 into engagement with the second interengaging structure 34 when the hook member 14 is moved to the second, compact configuration. In the embodiment shown, the biasing structure 36 comprises a second protrusion on the hook member 14, generally opposite the protrusion defining the second interengaging structure 34, as depicted in FIGS. 5A and 5B. As illustrated therein, as the hook member 14 is moved from the first configuration (FIG. 5A) toward the second configuration (FIG. 5B), the second protrusion defining the biasing structure 36 engages a portion of the hanger body 12 and urges the first protrusion defining the second interengaging structure 34 into engagement with the aperture defining the first interengaging structure 32.

Figure 8:
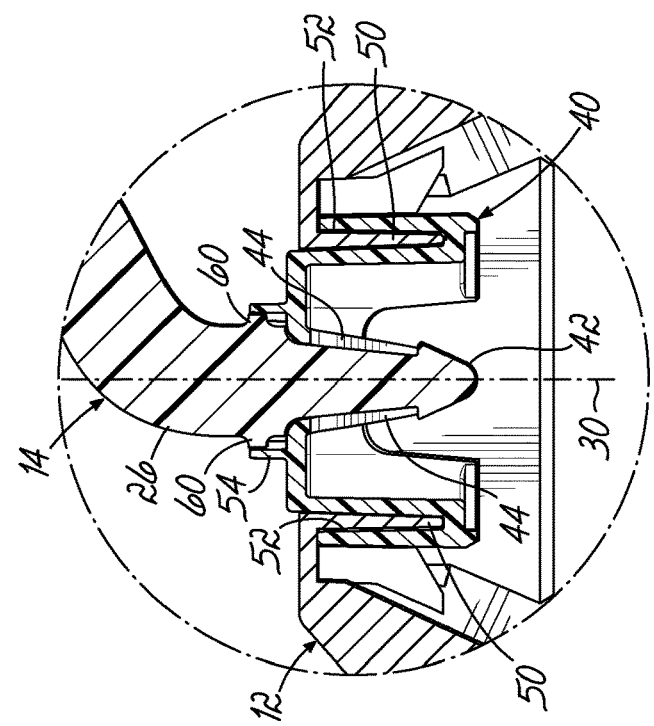
FIG. 8 is an enlarged view of the encircled area of FIG. 4A.

With continued reference to FIGS. 2, 3, 4A, and 4B, and referring further to FIG. 8, the floor mat hanger 10 further includes a keeper 40 that is selectively attachable to the shank portion 26 of the hook member 14 to thereby retain the hook member 14 on the hanger body 12 when the keeper 40 is attached to the hook member 14. In this regard, the hook member 14 further comprises first attaching structure 42 generally on a distal end of the shank portion 26, and the keeper 40 comprises second attaching structure 44 configured complementary to the first attaching structure 42. In the embodiment shown, the first attaching structure 42 comprises a barb disposed on the distal end of the shank portion 26 of the hook member 14, and the second attaching structure 44 comprises a jaw configured and arranged to receive the barb of the hook member 14 when the first and second attaching structures 42, 44 are engaged to secure the hook member 14 on the hanger body 12.

As best seen in FIGS. 3 and 8, the keeper 40 may include a keeper aperture 46 for receiving the distal end of the shank portion 26 of the hook member 14, and the jaw 44 on the keeper 40 may comprise first and second resilient jaw members proximate the keeper aperture 46, whereby the shank portion 26 of the hook member 14 may be received in the keeper aperture 46 for engagement with the first and second jaw members. As the barb of the first attaching structure 42 is urged through the keeper aperture 46, the first and second jaw members are deflected outwardly until the barb extends past the first and second jaw members. Thereafter, the first and second jaw members move inwardly toward the shank portion 26, thereby capturing the barb of the first attaching structure 42 within the keeper 40.

With particular reference to FIG. 8, the floor mat hanger 10 may further include first retaining structure on the hanger body 12, generally proximate the hanger aperture 20, and the keeper 40 may include second retaining structure complementary to the first retaining structure, whereby engagement of the first retaining structure and the second retaining structure helps to retain the keeper 40 proximate the hanger aperture 20. In the embodiment shown, the first retaining structure includes at least one fin 50, and the second retaining structure on the keeper 40 includes at least one channel 52 sized and arranged to receive the fin 50 therein when the first retaining structure engages the second retaining structure. In the embodiment shown, the first retaining structure includes first and second fins 50, and the second retaining structure includes two channels 52 for receiving the respective fins 50 in an engaged condition of the first and second retaining structures.

When the shank portion 26 of the hook member 14 is engaged with the jaw 44 of the keeper 40, and the second retaining structure 52 of the keeper 40 is engaged with the first retaining structure 50 of the hanger body 12, the hook member 14 is supported in the first configuration as generally depicted in FIGS. 1, 4A, and 8. In this arrangement, the first and second retaining structures 50, 52 may cooperate to prevent rotation of the keeper 40 relative to the hanger body 12 while the hook member 14 may permitted to rotate about the axis 30.

Figure 6:
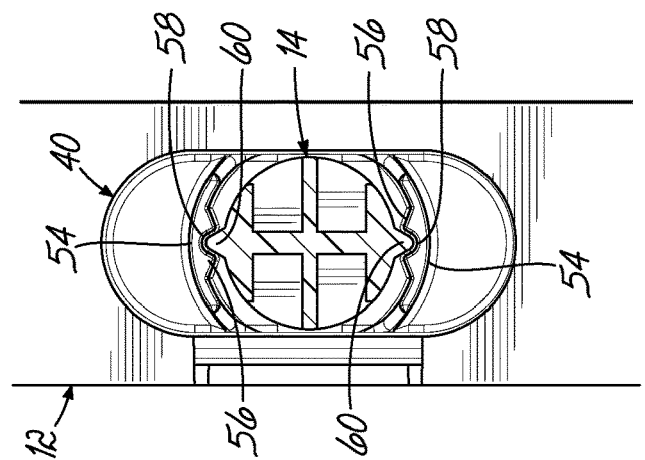
FIG. 6 is a partial cross-sectional view of the floor mat hanger of FIG. 4A, taken along line 6-6.

With particular reference to FIGS. 1, 3, and 6, the floor mat hanger 10 may further include angular positioning structure associated with the keeper 40 and cooperating with the hook member 14 to define discrete angular positions of the hook member 14 relative to the hanger body 12 when the keeper 40 is attached to the hook member 14. Accordingly, the hook member 14 may be selectively adjusted to discrete angular positions relative to the hanger body 12 to facilitate supporting floor mats on the floor mat hanger 10 in different positions as may be desired, for example, when the floormats are hung for display in a retail setting. In the embodiment shown, the angular positioning structure comprises at least a first wall 54 proximate the keeper aperture 46. The first wall 54 includes geometric features configured to cooperate with corresponding geometric features provided on the shank portion 26 of the hook member 14 to define the discrete angular positions of the hook member 14 relative to the hanger body 12. In the embodiment shown, the geometric features on the first wall 54 comprise one or more projections 56 or recesses 58 generally facing the keeper aperture 46, and the geometric features on the shank portion 26 of the hook member 14 comprise complementary shaped projections or recesses spaced and arranged to engage the projections 56 or recesses 58 in the first wall 54 when the shank portion 26 of hook member 14 is received in the keeper aperture 46. As seen in the figures, the exemplary embodiments comprises first and second walls 54 with respective projections 56 and recesses 58 for engaging corresponding projections 60 on the shank portion 26 of the hook member 14 to define the discrete angular positions. Accordingly, rotating the hook member 14 about the axis 30 causes the projections 60 on the shank portion 26 to engage different projections 56 or recesses 58 on the first and second walls 54, whereby the angular position of a plane containing a hook member 14 may be selectively adjusted relative to a plane containing the hanger body 12.

The floor mat hanger 10 may further include a plurality of header retention apertures 70 in the hanger body 12 which are configured to receive and secure a display panel 72 on the hanger body 12. Such a display panel 72 may include indicia, such as text and/or images, providing information about the one or more floor mats which may be supported on the floor mat hanger 10. With reference to FIG. 4B, the exemplary floor mat hanger 10 includes four header retention apertures 70 each configured to receive a portion of a display panel 72. In the embodiment shown, each header retention aperture 70 includes a first, elongate aperture portion 74 having a first width W1, and a second aperture portion 76 having a second width W2 which is shorter than the first width W1. The height of the header retention aperture 70 in the vicinity of the second width W2 may be larger than the height of the header retention aperture 70 outside the second width W2. The header retention aperture 70 may further include a header tab 78 that extends generally into the first and second aperture portions 74, 76. In the embodiment shown, the header tab 78 has a third width W3 that is shorter than the second width W2.

Figure 7:
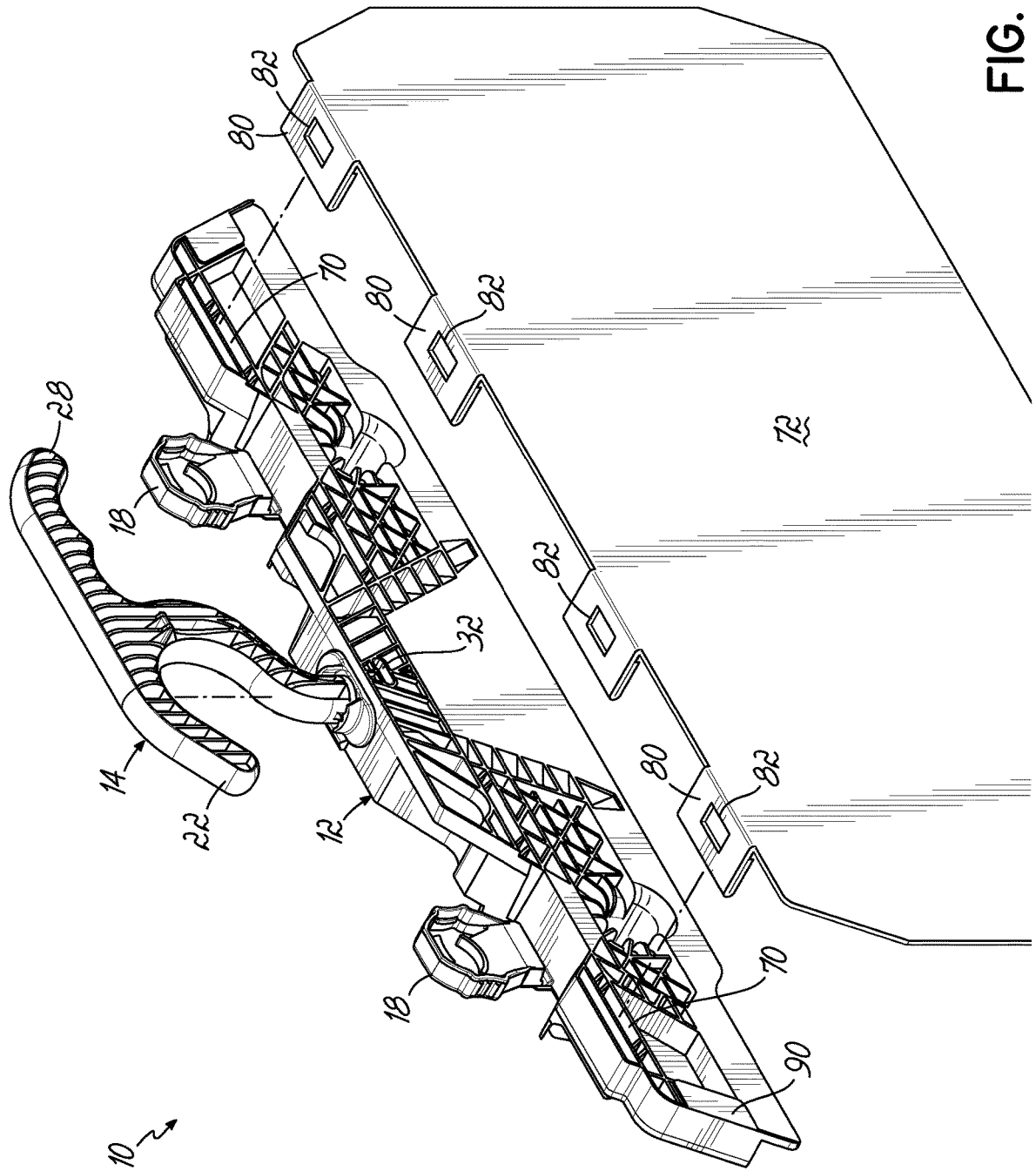
FIG. 7 is an exploded perspective view of another embodiment, wherein the floor mat hanger of FIG. 1 is coupled with a display panel.
Figure 9:
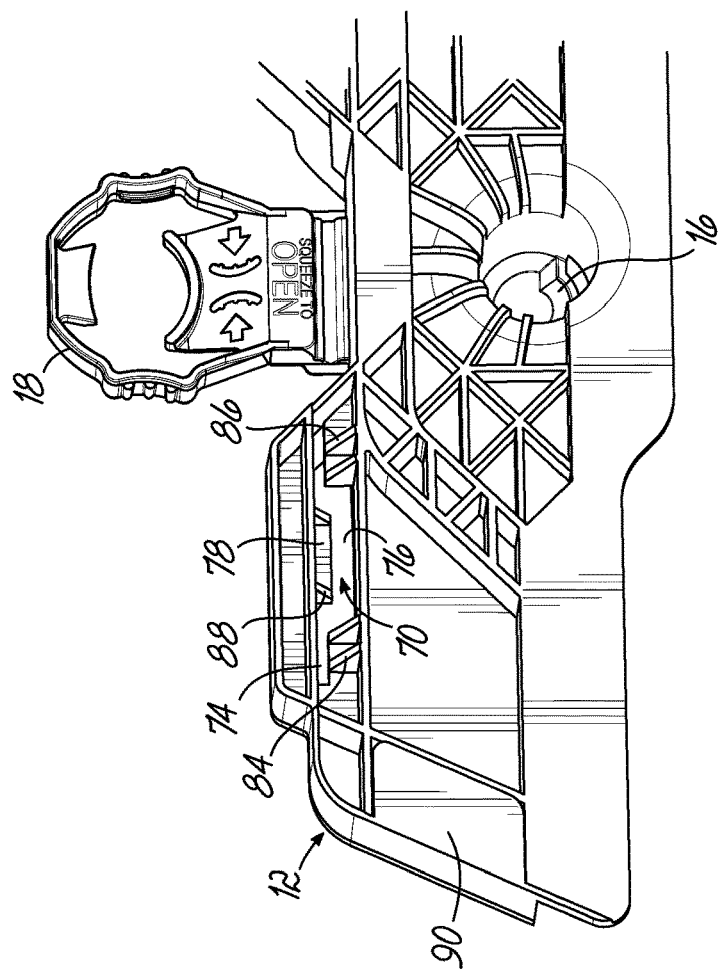
FIG. 9 is an enlarged perspective view of a lateral end of the floor mat hanger of FIG. 1.

Referring now to FIG. 7, an exemplary display panel 72 which is configured to be coupled with the hanger body 12 is illustrated. The display panel 72 comprises a generally planar portion and one or more panel tabs 80 sized and arranged to be received through the header retention apertures 70 in the hanger body 12. In the embodiment shown, each header tab 80 is sized to have a width which may be received within the first width W1 of the header retention aperture 70, and includes an aperture 82 positioned to engage the header tab 78 of the header retention aperture 70 when the panel tab 80 is received therein. As depicted in FIG. 9, the hanger body 12 may further include one or more inclined surfaces 84, 86, 88 proximate the respective header retention apertures 70 to facilitate guiding the panel tab 80 into the header retention aperture 70. When the panel tabs 80 of the display panel 72 are inserted through the header retention apertures 70 and engaged with the header tabs 78 of the header retention apertures 70, the display panel 72 is securely coupled with the hanger body 12. However, when it is desired to remove the display panel 72, the display panel apertures 82 may be disengaged from the header tabs 78 of the corresponding header retention apertures 70 and withdrawn therefrom.

With reference to FIGS. 1, 3, 7, and 9, the exemplary floor mat hanger may further include hanger tabs 90 on the hanger body 12 that cooperate with the header retention apertures 70 to secure a display panel 72 on the hanger body 12. In the embodiment shown, the floor mat hanger 10 includes two hanger tabs 90, each positioned at a respective lateral end of the hanger body 12 proximate at least one of the header retention apertures 70. When a display panel 72 is coupled with the header body 12 as described above, the hanger tabs 90 are positioned and arranged such that edge portions of the display panel 72 may be sandwiched between the hanger body 12 and the hanger tabs 90.

While the present invention has been illustrated by a description of various embodiments, and while these embodiments have been described in particular detail, the description is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:
1. A floor mat hanger, comprising:
a hanger body having a hanger aperture for receiving a support member, at least one post configured to support a floor mat thereon, and locking structure associated with the at least one post, the locking structure having a free condition wherein the floor mat can be received over or removed from the post, and a secured condition wherein the floor mat is prevented from being removed from the post;
a hook member selectively attachable to the hanger body through the hanger aperture, the hook member comprising an arcuate hook portion and a generally straight shank portion extending away from the arcuate hook portion;

the hook member selectively movable through the hanger aperture to and between a first configuration wherein the hook portion is spaced from the hanger body to facilitate hanging the hanger body from an external support structure, and a second configuration wherein the hook portion is positioned adjacent the hanger body in a compact arrangement and a keeper selectively attachable to the shank portion of the hook member, the keeper retaining the hook member on the hanger body when attached to the hook member.

2. The floor mat hanger of claim 1, further comprising:
first interengaging structure on the hanger body; and
second interengaging structure on the hook member configured complementary to the first interengaging structure;
the first and second interengaging structure cooperating to retain the hook member in the second configuration when the first interengaging structure is engaged with the second interengaging structure.

3. The floor mat hanger of claim 2, wherein one of the first or second interengaging structure comprises a first protrusion, and the other of the first or second interengaging structure comprises an aperture sized and arranged to receive the first protrusion when the first interengaging structure is engaged with the second interengaging structure.

4. The floor mat hanger of claim 2, further comprising biasing structure on at least one of the hanger body or the hook member, the biasing structure configured and arranged to urge the first interengaging structure into engagement with the second interengaging structure in the second configuration of the hook member on the hanger body.

5. The floor mat hanger of claim 4, wherein the biasing structure comprises a second protrusion on the hook member.

6. The floor mat hanger of claim 1, wherein the hook member comprises first attaching structure and the keeper comprises second attaching structure complementary to the first attaching structure, the first attaching structure engaging the second attaching structure when the keeper is attached to the shank portion of the hook member.

7. The floor mat hanger of claim 6, wherein one of the first attaching structure or the second attaching structure comprises a barb, and the other of the first attaching structure or the second attaching structure comprises a jaw configured and arranged to receive the barb when the first and second attaching structures are engaged.

8. The floor mat hanger of claim 1, wherein the keeper comprises a keeper aperture sized to receive the shank portion therethrough when the keeper is attached to the shank portion of the hook member.

9. The floor mat hanger of claim 1, further comprising:
first retaining structure on the hanger body and second complementary retaining structure on the keeper; the first retaining structure engaging the second retaining structure and retaining the keeper proximate the hanger aperture.

10. The floor mat hanger of claim 9, wherein the first retaining structure comprises at least one fin, and the second retaining structure comprises at least one channel sized to receive the at least one fin therein when the first retaining structure engages the second retaining structure.

11. The floor mat hanger of claim 9, wherein the first retaining structure and the second retaining structure cooperate to prevent rotation of the keeper relative to the hanger body when the first retaining structure engages the second retaining structure.

12. The floor mat hanger of claim 6, wherein the keeper further comprises angular positioning structure cooperating with the hook member and defining discrete angular positions of the hook member relative to the hanger body when the keeper is attached to the hook member, whereby the angular position of a plane containing the hook member may be selectively adjusted relative to a plane containing the hanger body.

13. The floor mat hanger of claim 12, wherein:
the keeper comprises a keeper aperture sized to receive the shank portion therethrough when the keeper is attached to the shank portion of the hook member; and
the angular positioning structure comprises at least a first wall proximate the keeper aperture, and projections or recesses on the first wall;
the projections or recesses on the first wall sized and arranged to engage corresponding structure on the shank portion to thereby define the discrete angular positions of the hook member relative to the hanger body.

14. The floor mat hanger of claim 1, further comprising:
a plurality of header retention apertures in the hanger body configured and arranged to receive and secure a display panel on the hanger body.

15. The floor mat hanger of claim 14, wherein at least one of the plurality of header retention apertures is defined by:
a first elongate aperture portion having a first width;
a second aperture portion having a second width shorter than the first width; and
a header tab extending into the first and second aperture portions, the header tab having a third width shorter than the second width.

16. The floor mat hanger of claim 15, further comprising:
at least one inclined surface adjacent at least one of the plurality of header retention apertures, the inclined surface engaging a portion of the display panel and guiding the portion of the display panel into the adjacent header retention aperture.

17. The floor mat hanger of claim 14, further comprising at least one hanger tab on the hanger body and positioned relative to at least one of the header retention apertures such that the display panel coupled with the hanger body and engaging the header retention aperture will be sandwiched between the hanger tab and the hanger body.

18. The floor mat hanger of claim 14, further comprising:
the display panel selectively removably attachable to, and detachable from, the hanger body;
the display panel comprising a generally planar portion and at least one panel tab sized and arranged to be received in one of the plurality of retention apertures in the hanger body.

* * * * *